United States Patent
Baeumlisberger

(10) Patent No.: US 10,895,476 B2
(45) Date of Patent: Jan. 19, 2021

(54) METHOD FOR DETECTING A COVERING STATE AND LABORATORY SAMPLE DISTRIBUTION SYSTEM

(71) Applicant: Roche Diagnostics Operations, Inc., Indianapolis, IN (US)

(72) Inventor: Tim Baeumlisberger, Ludwigsburg (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 277 days.

(21) Appl. No.: 15/996,580

(22) Filed: Jun. 4, 2018

(65) Prior Publication Data

US 2018/0356259 A1 Dec. 13, 2018

(30) Foreign Application Priority Data

Jun. 9, 2017 (EP) .................... 17175340

(51) Int. Cl.
| | | |
|---|---|---|
| *B01L 3/00* | (2006.01) | |
| *G01N 35/04* | (2006.01) | |
| *G01D 5/34* | (2006.01) | |
| *B67B 3/26* | (2006.01) | |
| *G01N 35/00* | (2006.01) | |
| *G01N 21/90* | (2006.01) | |

(52) U.S. Cl.
CPC ............ *G01D 5/34* (2013.01); *B01L 3/50825* (2013.01); *B67B 3/26* (2013.01); *G01N 21/909* (2013.01); *G01N 21/9054* (2013.01); *G01N 35/00* (2013.01); *G01N 35/04* (2013.01); *B01L 2300/041* (2013.01); *G01N 2035/00277* (2013.01); *G01N 2035/0403* (2013.01); *G01N 2035/0474* (2013.01)

(58) Field of Classification Search
None
See application file for complete search history.

(56) References Cited

U.S. PATENT DOCUMENTS

| | | | |
|---|---|---|---|
| 5,171,979 A | 12/1992 | Kwa et al. | |
| 5,528,026 A * | 6/1996 | Burri | G01N 21/909 250/223 B |
| 6,654,117 B1 * | 11/2003 | Reading | B67B 3/26 356/240.1 |
| 7,947,225 B2 | 5/2011 | Itoh | |
| 8,580,210 B2 | 11/2013 | Katsumi et al. | |

(Continued)

FOREIGN PATENT DOCUMENTS

| | | | |
|---|---|---|---|
| CN | 202164088 U | | 3/2012 |
| CN | 102486824 A | * | 6/2012 |
| CN | 102486824 A | | 6/2012 |

(Continued)

OTHER PUBLICATIONS

European Search Report dated Dec. 18, 2017, in Application No. EP 17175340, 2 pp.

*Primary Examiner* — Kathryn Wright
(74) *Attorney, Agent, or Firm* — Roche Diagnostics Operations, Inc.

(57) ABSTRACT

A method for detecting a covering state of a laboratory sample container is presented. Light is injected into the laboratory sample container and an optical power is measured at a measuring location. A corresponding laboratory sample distribution system is also presented.

9 Claims, 1 Drawing Sheet

(56) References Cited

U.S. PATENT DOCUMENTS

2002/0097396 A1* 7/2002 Schafer ............... G01N 21/909
                                              356/240.1
2013/0017595 A1   1/2013 Yamamoto et al.

FOREIGN PATENT DOCUMENTS

| CN | 203268433 U   | 11/2013 | |
|----|---------------|---------|---|
| CN | 203758920 U   | 8/2014  | |
| CN | 104492727 A   | 4/2015  | |
| EP | 3444616 A1 *  | 2/2019  | ............ G01N 35/04 |
| JP | H06-010856 U  | 2/1994  | |
| JP | H09-169392 A  | 6/1997  | |
| WO | 2000/022418 A1| 4/2000  | |

* cited by examiner

METHOD FOR DETECTING A COVERING STATE AND LABORATORY SAMPLE DISTRIBUTION SYSTEM

CROSS-REFERENCE TO RELATED APPLICATIONS

This application claims the benefit of EP 17175340.3, filed Jun. 9, 2017, which is hereby incorporated by reference.

BACKGROUND

The present disclosure relates to a method for detecting a covering state of a laboratory sample container and to a corresponding laboratory sample distribution system.

Laboratory sample distribution systems are typically used in order to distribute a large number of sample containers with respective samples between laboratory stations. Such laboratory stations can, for example, be used in order to determine if certain analytes are present in samples, and in what concentration.

Sample containers may be covered for example with respective foils. While most sample containers may typically be covered with a respective foil during transport in order to avoid spilling of samples, it may occur that a part of the sample containers is not sealed correctly by the foil. This can lead to spilling of samples and contamination of other samples or of the whole system.

Therefore, there is a need for a method for detecting a covering state of a laboratory sample container that allows for a reliable detection of the covering state.

SUMMARY

According to the present disclosure, a method for detecting a covering state of a laboratory sample container is presented. The laboratory sample container can at least partially be light conducting. The laboratory sample container can have an opening coverable by a dedicated cover. The method can comprise injecting light into the laboratory sample container and measuring an optical power of light at a measuring location. The measuring location can be chosen such that the measured optical power depends on the optical power of the light injected into the laboratory sample container and depends on the covering state. The method can also comprise detecting a covered state, a partially covered state and/or a non-covered state of the laboratory sample container depending on the measured optical power.

In accordance with one embodiment of the present disclosure, a laboratory sample distribution system for performing the above method is presented. The laboratory sample distribution system can comprise a light emitter configured to inject light into a laboratory sample container, a sensor positioned at a measuring location and configured to measure an optical power of light at the measuring location, and a control device configured to detect a covered state, a partially covered state and/or a non-covered state of the laboratory sample container depending on the measured optical power.

Accordingly, it is a feature of the embodiments of the present disclosure to provide for a method for detecting a covering state of a laboratory sample container that allows for a reliable detection of the covering state. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
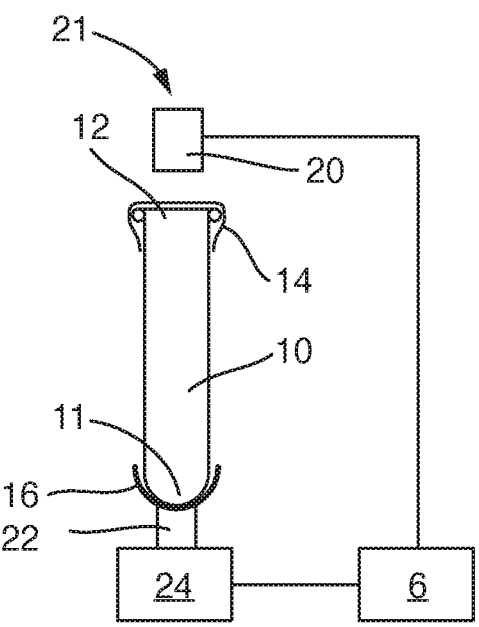
FIG. 1 illustrates a part of a laboratory sample distribution system according to a first embodiment of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

A method for detecting a covering state of a laboratory sample container is presented. A covering state may be a state relating to a foil or other cover being either present or non-present on an opening of the sample container. In addition, a covering state may denote a covering degree of the opening by the foil or other cover. For example, it may be detected if the opening is fully covered, partially covered or not covered by the foil or other cover.

The laboratory sample container can at least be partially light conducting. The laboratory sample container can have an opening coverable by a dedicated cover.

The method can comprise injecting light into the laboratory sample container, measuring an optical power of light at a measuring location, wherein the measuring location is chosen such that the measured optical power depends on the optical power of the light injected into the laboratory sample container and depends on the covering state, and detecting a (fully) covered state, a partially covered stated or a non-covered state of the laboratory sample container depending on the measured optical power.

By the above method, a covering state can be reliably detected without the need to use complex technology. It may not be necessary to use image recognition or manual intervention in order to determine if a sample container is correctly covered. It can be sufficient to inject light into the sample container and to measure a resulting light intensity in order to determine if a cover is placed in the path of the light.

The light may be injected into the laboratory sample container at a longitudinal end opposite to the opening such that the light can be conducted along a longitudinal extension of the sample container and leave the sample container at the opening.

The light may be injected into the laboratory sample container at a support holding the laboratory sample container.

According to an embodiment, the light can be injected into the laboratory sample container using a wave-guiding element. This can allow using a light source distant to the sample container. The light can be conducted using the wave-guiding element. For example, an optical fiber such as, for example, a glass fiber, can be used.

According to an embodiment, the optical power can be measured using a sensor positioned at the measuring location besides the opening, such that the sensor can be illuminated by light that has been injected into the laboratory sample container and emanated from the laboratory sample container if the opening is not covered or only partially covered by a cover. Such a sensor may, for example, be embodied as a photo detector. The determination if a sample container is fully covered or not may especially be made using a comparison of the measured optical power with a given or known threshold value.

According to an embodiment, the light can emanate out from the laboratory sample container in a region of the laboratory sample container forming the opening. Light can typically be prevented from emanating out by a cover, if the cover correctly covers the opening.

According to an embodiment, the measured optical power of light at the measuring location can be normalized by a normalizing value. The normalizing value can be a measured optical power in the non-covered state of the laboratory sample container. The covered state, the partially covered state or the non-covered state can be detected depending on the normalized measured optical power. This can allow for a simple and suitable reference for determining the covering state.

A laboratory sample distribution system configured to perform the above method is also presented. With regard to the method, all embodiments and variations as disclosed herein can be applied.

The laboratory sample distribution system can comprise a light emitter, for example, an LED, configured to inject light into a laboratory sample container.

The laboratory sample distribution system can further comprise a sensor positioned at a measuring location and configured to measure an optical power of light at the measuring location.

The laboratory sample distribution system can further comprise a control device configured to detect a covered state, a partially covered state or a non-covered state of the laboratory sample container depending on the measured optical power.

The measuring location can be such that the measured optical power can depend on the optical power of the light injected into the laboratory sample container and can depend on the covering state.

By the above laboratory sample distribution system, the above method can be suitably performed. For example, a plurality of sample containers can be easily checked regarding their covering state According to an embodiment, the control device can be configured to influence or suspend further processing of a laboratory sample container depending on the covering state of the sample container. This can, for example, prevent the laboratory sample container not correctly covered by a cover from entering transport systems or regions where spilling could occur. The control device may be configured to transport such a sample container securely to a capping station in order to provide for a suitable cover of the laboratory sample container.

According to an embodiment, the laboratory sample distribution system can comprise a transport device for transporting a plurality of laboratory sample containers. The transport device can comprise a number of support elements each having a respective opening for receiving a respective laboratory sample container. The light emitter can be arranged at a position alongside the transport device to inject the light into a laboratory sample container received in a support element.

Such a transport device may be used in order to transport the sample containers between stations or for other purposes. The detection of the covering state can be made alongside a transport path.

According to an embodiment, the transport device can be a conveyor belt or conveyor chain.

Referring initially to FIG. 1, FIG. 1 shows a part of a laboratory sample distribution system 5 according to a first embodiment of the invention. The laboratory sample distribution system 5 can be configured to perform the above method.

The laboratory sample distribution system 5 can comprise a support 16 for holding a sample container 10. The sample container 10 may be filled with a sample that is to be analyzed by analyzing stations not shown in the figures. The sample is also not shown.

The sample container 10 can have a lower end 11 and an opening 12. The lower end 11 and the opening 12 can be positioned at opposing longitudinal ends of the sample container 10.

The opening 12 can be covered by a cover 14. The cover 14 can be embodied as a foil.

Below the support 16, the laboratory sample distribution system 5 can comprise a light emitter 24 embodied as a suitable light emitting device such as, for example, a LED. Between the light emitter 24 and the support 16, a waveguiding element 22 can be arranged. By the shown arrangement, light emitted from the light emitter 24 can be guided to the support 16 and can be injected into the bottom end of the sample container 10.

The sample container 10 can be made of material transparent for the light emitted by the light emitter 24. The material may be glass or transparent plastic. Thus, the light injected in at bottom or lower end 11 of the sample container 10 can be guided inside the sample container 10 towards the opening 12.

Just above the opening 12, a sensor 20 can be positioned at a measuring location 21. The sensor 20 can be embodied as a conventional light detector.

The sensor 20 can be coupled to a control device 6, which can also be coupled to the light emitter 24. The control device 6 may, for example, be embodied as a microcontroller.

If a covering state of a sample container 10 is to be determined, i.e. it is to be determined if the sample container 10 is in fact covered by the depicted cover 14, the control device 6 can activate the light emitter 24 such that light can be emitted and injected into the sample container 10. Then, an optical power can be detected using the sensor 20.

If the optical power is below a predefined threshold, it can be determined that the sample container 10 is covered, because the cover 14 can prevent the light from being emitted out of the sample container 10 at the opening 12 towards the sensor 20. If the measured power is above the predefined threshold, it can be determined that the sample container 10 is not correctly covered, because light can be emitted freely at the opening 12. It can be noted that also different thresholds can be used for determining a fully covered state, a partially covered state or non-covered state, and that an undefined state may be determined if the optical power is between these thresholds. The threshold(s) may, for example, be determined empirically, for example, by measuring the optical power in the covered state, in a defined partially covered state and in the non-covered state. This may, for example, be done for different sample containers and/or different sample container materials.

The measured optical power of light at the measuring location 21 may be normalized by a normalizing value. The normalizing value can be a measured optical power in the non-covered state of the laboratory sample container 10. The covered state, the partially covered state or the non-covered state can be detected depending on the normalized measured optical power. This can provide a very easy and reliable determination of a covering state of the sample container 10.

Figure 2:
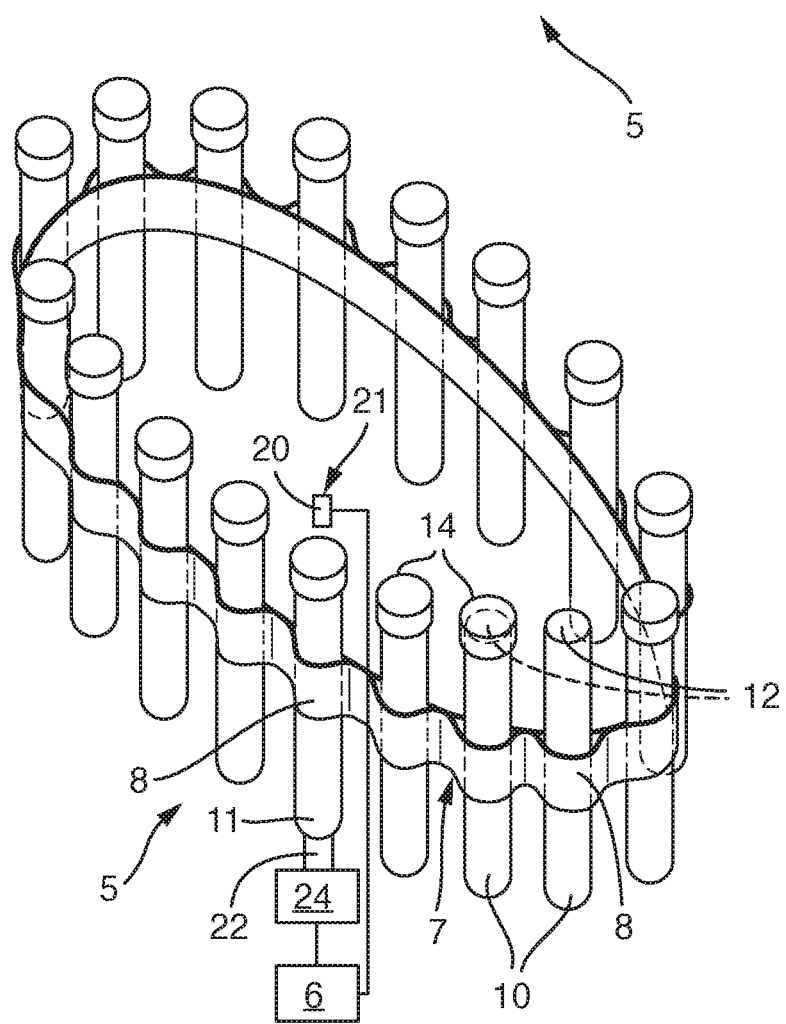
FIG. 2 illustrates a part of a laboratory sample distribution system according to a second embodiment of the present disclosure.

FIG. 2 shows a part of a laboratory sample distribution system 5 according to a second embodiment. The laboratory sample distribution system 5 can comprise a transport device in the form of a conventional conveyor belt 7. The conveyor belt 7 can comprise a plurality of support elements 8. Each support element 8 can be embodied for holding a respective sample container 10. The conveyor belt 7 can be embodied to transport the sample containers 10 comprised in its support elements 8 along a given circular path.

At the depicted position along the path formed by the conveyor belt 7, a method for detecting a covering state of the respective sample container 10 can be arranged. Such a method can be embodied similar to FIG. 1. The support 16 can be omitted, since the sample container 10 can be held by a corresponding support element 8 of the conveyor belt 7. Reference is made to the above description of FIG. 1 regarding the remaining elements.

The covering state of the sample containers 10 being conveyed by the conveyor belt 7 may be determined on the flight, i.e. during the conveying process. If a sample container 10 reaches the dedicated position, light can be emitted from the light emitter 24. The light can be guided using the wave-guiding elements 22 and can be injected into the sample container 10 at its lower end 11. An optical power can be measured using the sensor 20 at the measuring location 21 just above the opening 12 of the sample container 10. The control device 6 can be configured to determine the covering state of the sample container 10 just as described with respect to FIG. 1.

As shown in the example of FIG. 2, only one sample container 10 is not covered by a cover 14. If the sample container 10 not covered by a cover 14 can be checked for its covering state, light can be emitted freely around its opening 12. Thus, according to the principle described above, it can be detected as being in a non-covered or partially covered state. For example, further operation with this sample container can be prevented or otherwise corrected until it is covered correctly.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

I claim:

1. A method for detecting a covering state of a laboratory sample container, wherein the laboratory sample container is at least partially light conducting and wherein the laboratory sample container has a bottom surface and an opening coverable by a dedicated cover, the method comprising:

injecting light into the bottom surface of the laboratory sample container which opposite the opening of the laboratory sample container, wherein the light is injected into the laboratory sample container along the longitudinal axis of the laboratory sample container toward the opening:

measuring an optical power of light at a measuring location, wherein the measuring location is chosen such that the measured optical power depends on the optical power of the light injected into the laboratory sample container and depends on the covering state of the dedicated cover over the opening of the laboratory sample container: and detecting a covered state, a partially covered state and/or a non-covered state of the opening of the laboratory sample container by the dedicated cover depending on the measured optical power, wherein the optical power is measured using a sensor positioned at the measuring location adjacent the opening of the laboratory sample container such that the sensor is illuminated by light that has been injected into the laboratory sample container and emanated from the laboratory sample container when the opening is not covered or partially covered by the cover.

2. The method according to claim 1, wherein the light is injected into the laboratory sample container at a support holding the laboratory sample container.

3. The method according to claim 1, wherein the light is injected into the laboratory sample container using a wave-guiding element.

4. The method according to claim 1, wherein the light emanated from the laboratory sample container in a region of the laboratory sample container forming the opening.

5. The method according to claim 1, wherein the measured optical power of light at the measuring location is normalized by a normalizing value, wherein the normalizing value is a measured optical power in the non-covered state of the laboratory sample container, and wherein the covered state, the partially covered state and/or the non-covered state is detected depending on the normalized measured optical power.

6. A laboratory sample distribution system for performing the method of claim 1, the laboratory sample distribution system comprising:

a light emitter arranged the longitudinal end of the laboratory sample container configured to inject light into a laboratory sample container;

a sensor positioned at the measuring location positioned above the opening and configured to measure the optical power of light at the measuring location;

a control device coupled to both the light emitter and the sensor and configured to detect the covered state, the partially covered state and/or the non-covered state of the laboratory sample container by the dedicated cover depending on the measured optical power; and a transport device for transporting a plurality of laboratory sample containers, wherein the light emitter is arranged at a position alongside the transport device to inject the light into a laboratory sample container arranged in the transport device.

7. The laboratory sample distribution system according to claim 6, wherein the control device is configured to influence further processing of a laboratory sample container if a non-covered state or a partially covered state of the laboratory sample container is detected.

8. The laboratory sample distribution system according to claim 6,
wherein the transport device comprises a number of support elements, each having a respective opening for receiving a respective laboratory sample container.

9. The laboratory sample distribution system according to claim 8, wherein the transport device transports the plurality of laboratory sample containers via conveyor belt.

* * * * *